United States Patent
Kawanishi (10) Patent No.: US 8,121,470 B2
(45) Date of Patent: Feb. 21, 2012

(54) FOCUSING DEVICE, IMAGE PICK-UP APPARATUS, AND CONTROL METHOD

(75) Inventor: Atsuya Kawanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 11/779,758

(22) Filed: Jul. 18, 2007

(65) Prior Publication Data

US 2008/0025717 A1 Jan. 31, 2008

(30) Foreign Application Priority Data

Jul. 25, 2006 (JP) ................................ 2006-202137
Aug. 25, 2006 (JP) ................................ 2006-228960

(51) Int. Cl.
*G03B 3/10* (2006.01)

(52) U.S. Cl. ...................................... 396/121; 396/135

(58) Field of Classification Search .................. 396/72, 396/79, 121–123; 348/345, 349, 354–356
See application file for complete search history.

(56) References Cited

U.S. PATENT DOCUMENTS

| | | | | |
|---|---|---|---|---|
| 4,922,346 A * | 5/1990 | Hidaka et al. | ................. | 348/355 |
| 5,376,991 A * | 12/1994 | Kaneda et al. | ................. | 396/49 |
| 5,576,764 A * | 11/1996 | Noh et al. | ...................... | 348/356 |
| 6,239,912 B1 * | 5/2001 | Ozawa | ........................ | 359/618 |
| 2003/0012568 A1 * | 1/2003 | Ishikawa et al. | ............ | 396/104 |
| 2003/0020825 A1 * | 1/2003 | Higuma et al. | .............. | 348/354 |
| 2005/0062872 A1 * | 3/2005 | Nakashima et al. | ......... | 348/349 |
| 2006/0232700 A1 * | 10/2006 | Ito et al. | ........................ | 348/345 |
| 2007/0065127 A1 * | 3/2007 | Suda | .............................. | 396/52 |

FOREIGN PATENT DOCUMENTS

| | | |
|---|---|---|
| JP | 05-346536 A | 12/1993 |
| JP | 06-006660 A | 1/1994 |
| JP | 06-006660 A | 1/1994 |
| JP | 2002-258147 A | 9/2002 |
| JP | 2005-121819 A | 5/2005 |

OTHER PUBLICATIONS

Japanese Office Action for Appln. No. 2006-228960 dated Sep. 6, 2011.

* cited by examiner

*Primary Examiner* — Clayton E Laballe
*Assistant Examiner* — Warren Fenwick
(74) *Attorney, Agent, or Firm* — Carter, DeLuca, Farrell & Schmidt LLP (57) ABSTRACT

A focusing device includes a first focus-position determining unit configured to determine a focus position based on a change in a radio-frequency component in an image signal obtained with movement of a focusing lens, a second focus-position determining unit configured to determine a focus position by using a different process from a process performed by the first focus-position determining unit, a mode setting unit configured to select at least a first mode which uses a result with the first focusing-position determining unit together with the second focusing-position determining unit or a second mode which uses a result with the first focus-position determining unit without the second focus-position determining unit, and a control unit configured to control driving of the focusing lens according to selection by the mode setting unit such that the focusing lens is driven in the first mode at a higher speed than in the second mode.

5 Claims, 12 Drawing Sheets

FOCUSING DEVICE, IMAGE PICK-UP APPARATUS, AND CONTROL METHOD

BACKGROUND OF THE INVENTION

1. Field of the Invention

The present invention relates to a focusing technique for use in an image pick-up apparatus.

2. Description of the Related Art

Some image pick-up apparatuses, such as video cameras, use an auto focus control achieved by detecting a focus signal representing the sharpness of a screen from an image signal obtained by photoelectrically converting an object image by use of an image pick-up element, such as a charge-coupled device (CCD) or a complementary mental-oxide semiconductor device (CMOS). This control is an AF system that controls the position of a focusing lens so as to maximize the level of a focus signal (hereinafter referred to sometimes as a TV-AF process).

Figure 2:
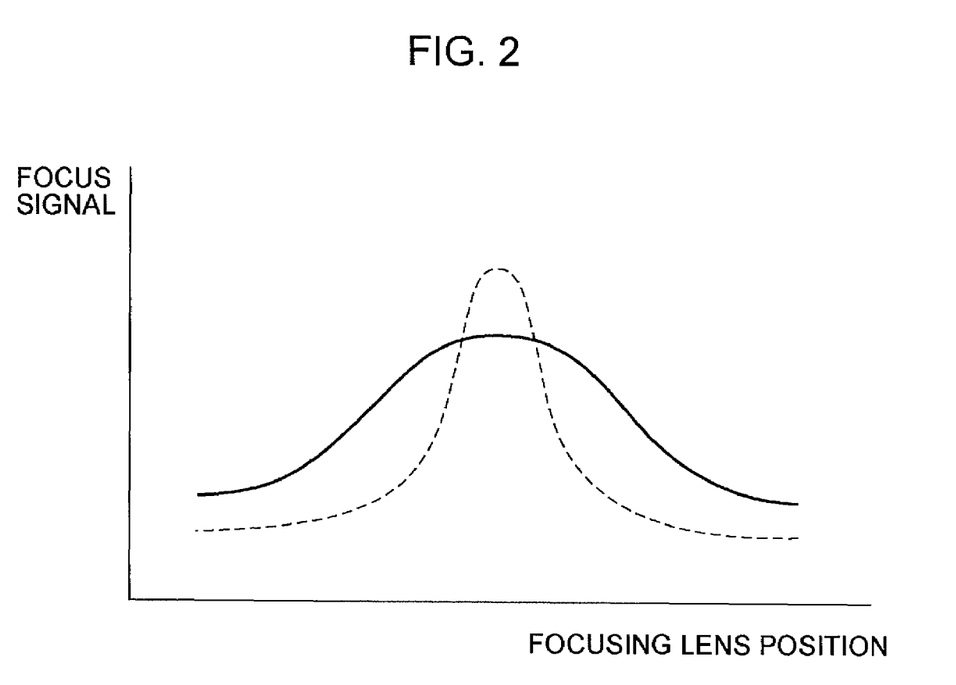
FIG. 2 illustrates characteristics of a focus signal.

A focus signal used in the TV-AF process generally employs a radio-frequency component of an image signal extracted by a band-pass filter for a certain band. For a normal object image, as illustrated in a graph of FIG. 2, where the horizontal axis represents the position of a focusing lens and the vertical axis represents the level of a focus signal, the level of the focus signal increases with focusing. The point at which the focus signal exhibits the maximum level is considered as a focus position.

One of the other AF systems is a through-the-lens (TTL) phase detection process, which is widely used in film-based SLR cameras. The TTL phase detection process is achieved by first dividing a beam that has passed an exit pupil of an objective taking lens into two, then receiving the two-divided beams with a set of focus detection sensors, and thus detecting the amount of difference between signals output in accordance with the amount of received light, i.e., the amount of relative position displacement (phase difference) in directions in which the beam is divided into two. On the basis of the phase difference, the amount of deviation of the objective taking lens in a focusing direction is determined. Therefore, since the amount and direction of defocusing can be obtained by a single storing operation performed using the focus detection sensors, a high-speed focusing operation can be realized.

Another type of the phase detection is an external metering phase detection process, which has a metering sensor independently of an objective taking lens. The external metering phase detection process is achieved by receiving beams from an object with a set of focus detection sensors, then detecting the amount of relative position displacement, and thus determining an object distance from triangulation. Other examples of an AF system that uses an external metering sensor include a system that measures a propagation velocity by use of an ultrasonic sensor and a system that surveys by triangulation by use of an infrared sensor, which is often used in compact cameras.

Recently, a hybrid AF technique utilizing combination of the above described AF systems has been proposed. For example, Japanese Patent Laid-Open No. 2005-121819 and No. 5-346536 disclose a hybrid AF system that first drives a focusing lens up to the vicinity of a focus position by the TTL phase detection process and then shifts to the TV-AF process to drive the focusing lens to the focus position more precisely.

In general, a hybrid AF system first moves a focusing lens to a focus position determined by the phase detection process. Only when a focus signal exceeds a predetermined level, the phase detection process is changed to the TV-AF process, and the focusing lens is moved to a more precise focus position. This is because the TV-AF process has a higher accuracy in determining a focus state than other AF processes. However, generally, the speed of driving the focusing lens in the TV-AF process is required to be smaller than that in the phase detection process because it is necessary for the TV-AF process to detect a focus signal while moving the focusing lens.

In this respect, a technique disclosed in the first mentioned patent document (No. 2005-121819) can set an optimal TV-AF drive parameter depending on a result of comparison of focus-signal information and focus-position information obtained by a phase difference sensor. Therefore, this technique addresses a problem of focus changes leading to user discomfort by increasing accuracy in searching for the best focus position in the TV-AF process and by reducing the time required for obtaining a focus state.

Unfortunately, however, when an object is present adjacent to a camera or when a contrast of an object is low, it is often impossible to meter an object distance by use of a phase difference or, even if possible, it is difficult to obtain sufficiently accurate results by metering. The second mentioned patent document (No. 5-346536) discloses a technique for improving reliability of results of the phase detection process by determining how image patterns in the phase detection process match each other, i.e., how a pair of images formed by a focus detection optical system resemble each other, and calculating the degree of matching.

When reliability of the phase detection process is low, as in the above described examples, if output information from a phase difference sensor is used in the TV-AF process, as described in the first patent document, the speed of driving the focusing lens in the TV-AF process is sometimes significantly lower than that in the phase detection process. That is, the speed of driving the focusing lens heavily depends on an object being shot. Therefore, for a combined use of the TV-AF process and the phase detection process, the difference between the speed of driving the focusing lens in the TV-AF process and that in the phase detection process may be undesirably large depending on the state of the object.

SUMMARY OF THE INVENTION

The present invention provides a focusing technique that uses a combination of a TV-AF process and a different process and that can greatly reduce user discomfort compared with known techniques.

According to a first aspect of the present invention, a focusing device includes a first focus-position determining unit, a second focus-position determining unit, a mode setting unit, and a control unit. The first focus-position determining unit is configured to determine a focus position on the basis of a change in a radio-frequency component in an image signal obtained with movement of a focusing lens. The second focus-position determining unit is configured to determine a focus position by using a different process from a process performed by the first focus-position determining unit. The mode setting unit is configured to be able to select at least a first mode which uses a determining result with the first focusing-position determining unit together with the second focusing-position determining unit or a second mode which uses a determining result with the first focus-position determining unit without the second focus-position determining unit. The control unit is configured to control driving of the focusing lens in accordance with selection performed by the mode setting unit and to control the focusing lens to be driven in the first mode at a higher speed than in the second mode.

According to a second aspect of the present invention, a focusing device includes a focus-state determining unit, a focus-position determining unit, and a control unit. The focus-state determining unit is configured to determine a focus state on the basis of a change in a radio-frequency component of an image signal obtained through a focusing lens. The focus-position determining unit is configured to determine a focus position by using a different process from a process performed by the focus-state determining unit. The control unit is configured to control driving of the focusing lens, move the focusing lens at a first driving speed on the basis of the focus position determined by the focus-position determining unit, invert a driving direction of the focusing lens on the basis of determination as to the focus state performed by the focus-state determining unit, and move the focusing lens at a second driving speed lower than the first driving speed after inverting the driving direction.

Further features and aspects of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments, features and aspects of the present invention will be described with reference to the accompanying drawings.

First Exemplary Embodiment

Figure 1:
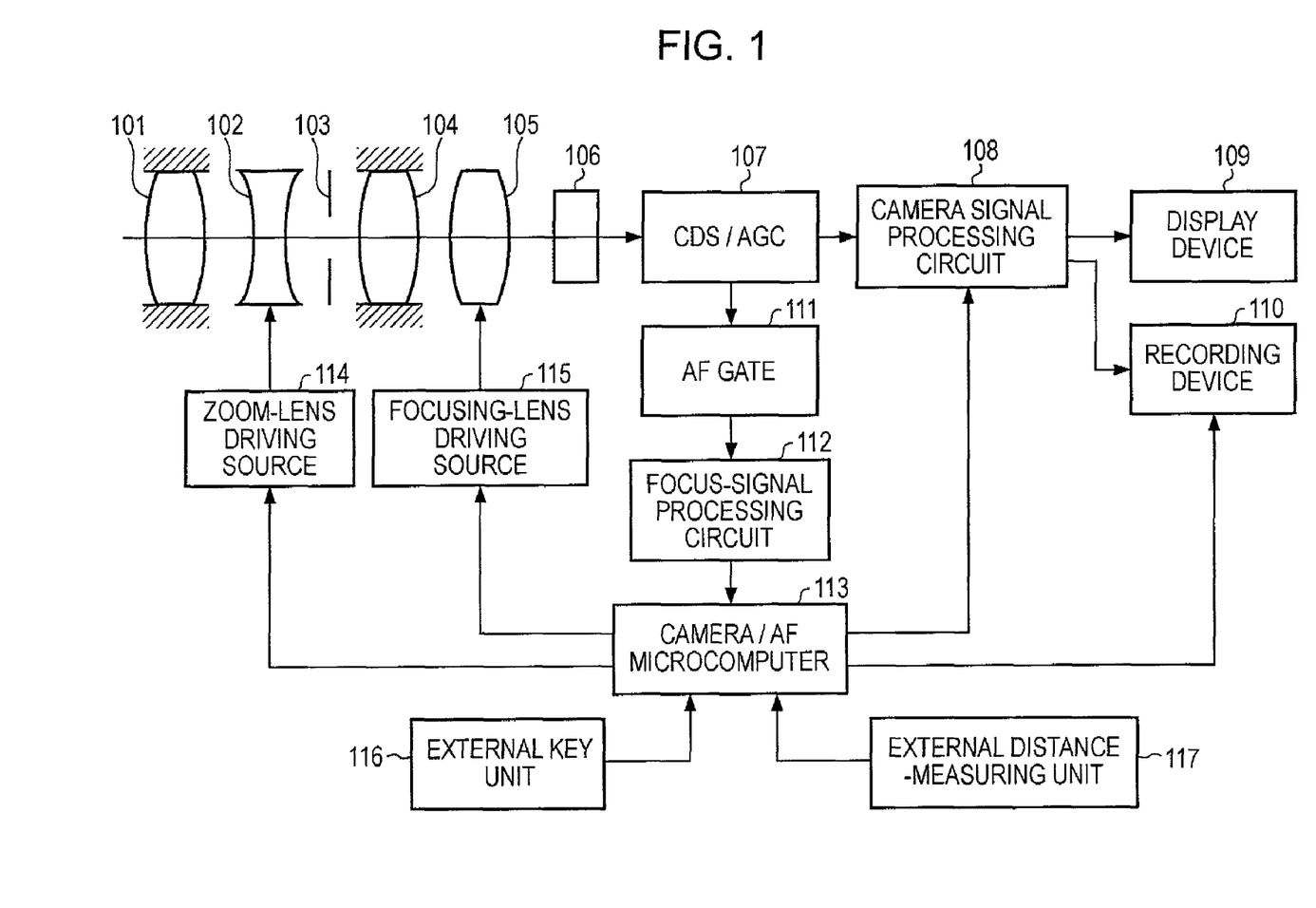
FIG. 1 is a block diagram of an example image pick-up apparatus according to a first embodiment of the present invention.

FIG. 1 is a block diagram of an image pick-up apparatus according to the present embodiment. Referring to FIG. 1, a first lens unit 101 is fixed, a zoom lens 102 functions to vary magnification, an aperture stop 103 functions as an aperture stop, and a second lens unit 104 is fixed. A focus compensation lens 105 functions both to correct movement of a focal plane caused by zooming and to perform focusing (hereinafter referred to as focusing lens). An image pick-up element 106 can be, for example, a CCD or a CMOS. A CDS/AGC/AD converter 107 samples an output of the image pick-up element 106, performs gain control thereon, and converts the output to digital form. A camera signal processing circuit 108 processes an output signal from the CDS/AGC/AD converter 107 and then generates an image signal. A display device 109 displays an output signal from the camera signal processing circuit 108 and allows a user to monitor an image. A recording device 110 records information by using magnetic tape, an optical disk, a semiconductor memory, or other memory element. An AF gate 111 transmits only a signal in a range to be used in focus detection among output signals from the CDS/AGC/AD converter 107. A focus-signal processing circuit 112 extracts a radio-frequency component from a signal that has passed through the AF gate 111. A camera/AF microcomputer 113 controls a focusing-lens driving source 115, which will be described below, in response to an output signal from the focus-signal processing circuit 112 and issues an instruction to record an image to the recording device 110. A zoom-lens driving source 114 includes an actuator for moving the zoom lens 102 and a driver therefor. The focusing-lens driving source 115 includes an actuator for moving the focusing lens 105 and a driver therefor. An external key unit 116 includes a menu button which the user operates to switch a use or non-use mode in the phase detection process and a zoom switch which the user operates to perform zooming. An external distance-measuring unit 117 can be used in any techniques, such as phase detection (e.g., external metering or TTL), a process that uses an ultrasonic sensor, and a process that uses an infrared light sensor, as described in the related art.

Figure 3:
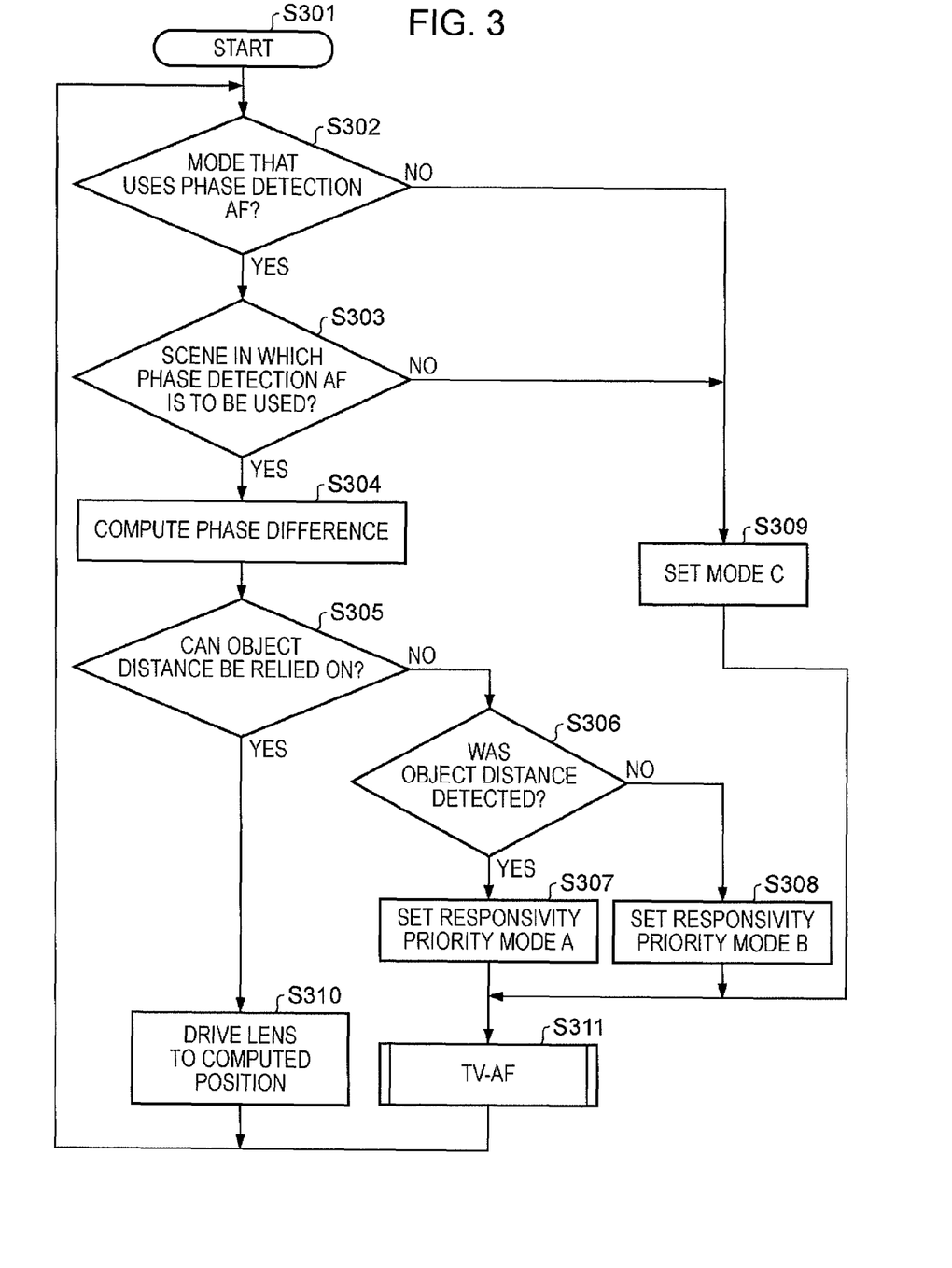
FIG. 3 is a flowchart of a hybrid focusing control.

An overview of a focusing control performed by the camera/AF microcomputer 113 will now be described with reference to FIG. 3. Processing illustrated in FIG. 3 is performed by the camera/AF microcomputer 113 unless otherwise specified. In step S301, the processing starts. In step S302, on the basis of information from the external key unit 116, it is determined whether a mode that uses the phase detection process is to be employed. If so, flow proceeds to step S303; otherwise to step S309. This is because there is a possibility that a focus position largely varies after an object is changed. Therefore, it is necessary to drive the focusing lens 105 more responsively than normal cases.

In step S303, it is determined whether a target scene is a scene in which the phase detection process is to be employed, for example, a scene after an object is changed, such as panning or movement of the object. If so, flow proceeds to step S304; otherwise flow proceeds to step S309.

In step S304, the external distance-measuring unit 117 computes a phase difference and calculates the position of the focusing lens 105 corresponding to an object distance. In step S305, it is determined whether a result of computation performed by the external distance-measuring unit 117 in step S304 can be relied on and the result can be used in driving the focusing lens 105. If so, flow proceeds to step S310; otherwise flow proceeds to step S306.

In step S306, it is determined whether the result of computation performed by the external distance-measuring unit 117 in step S304 was obtained as information corresponding to the object distance. If so, flow proceeds to step S307; otherwise flow proceeds to step S308.

In step S307, a drive parameter for the TV-AF process is set to a responsivity priority mode A. In the responsivity priority mode A, a condition for shifting to a hill-climbing driving operation, which will be described below, and the speed of driving the focusing lens 105 are set.

More specifically, when the number of times the focusing lens 105 has been successively moved in the same direction is smaller than that for a mode C, which will be described below, the present mode shifts to the hill-climbing driving mode. The speed of driving the focusing lens 105 in the hill-climbing driving mode, described below, is higher than that for the mode C, described below. Increasing the speed of driving the focusing lens 105 in this way reduces the difference in the speed of driving the focusing lens 105 between the phase detection process and the TV-AF process.

In step S308, the drive parameter for the TV-AF process is set to a responsivity priority mode B. In the responsivity priority mode B, in addition to the parameter set in the responsivity priority mode A, a vibration amplitude for the focusing lens 105 is set.

More specifically, in driving the focusing lens 105 so as to reciprocate in a minute driving mode, which will be described below, the amplitude and a center-shifting amplitude are set to be larger than those for the responsivity priority mode A or mode C, which will be described below. This aims to increase the difference between obtained focus signals by largely moving the focusing lens 105. In other words, even when the object distance cannot be detected, a great difference between focus signals facilitates determination as to which side the peak of a hill (focus position) is present, a minimum-object-distance side or an infinite-distance side. In contrast, for the responsivity priority mode A, it is determined that the object distance had been detected in step S306, and the detected information is sufficient to control the driving of the focusing lens 105. Therefore, the vibration amplitude is smaller than that for the responsivity priority mode B.

In step S309, the mode C is set. This case does not correspond to a mode that uses a result of detection by the phase detection process in step S302 or a scene that is to use a result of detection by the phase detection process in step S303. That is, this case requires the TV-AF control, in which an improvement in stability of an image being shot has higher priority than an increase in responsivity of focusing with respect to a change of an object image. As a result, the condition for shifting to the hill-climbing driving operation in the mode C is more difficult than that in each of the responsivity priority modes A and B (i.e., for the mode C, the present mode is not shifted to the hill-climbing driving mode unless the focusing lens 105 successively moves in the same direction a number of times larger than in these modes A and B). In addition, the speed of driving the focusing lens 105 in the mode C is smaller than that in each of the responsivity priority modes A and B. This is because, in the mode C, a focus signal is obtained more frequently with respect to the movement distance of the focusing lens 105. Furthermore, the amplitude of the focusing lens 105 during the minute driving operation in the mode C is smaller than that in the responsivity priority mode B. This is because the stability of the image quality in shooting has priority in the mode C, while the responsivity priority mode requires quick calculation of a focus direction even when the object distance cannot be detected.

In step S310, the focusing lens 105 is driven up to a position computed in step S304 at a predetermined speed.

In step S311, the TV-AF control is performed in accordance with the mode set in step S307, S308, or S309.

Figure 4:
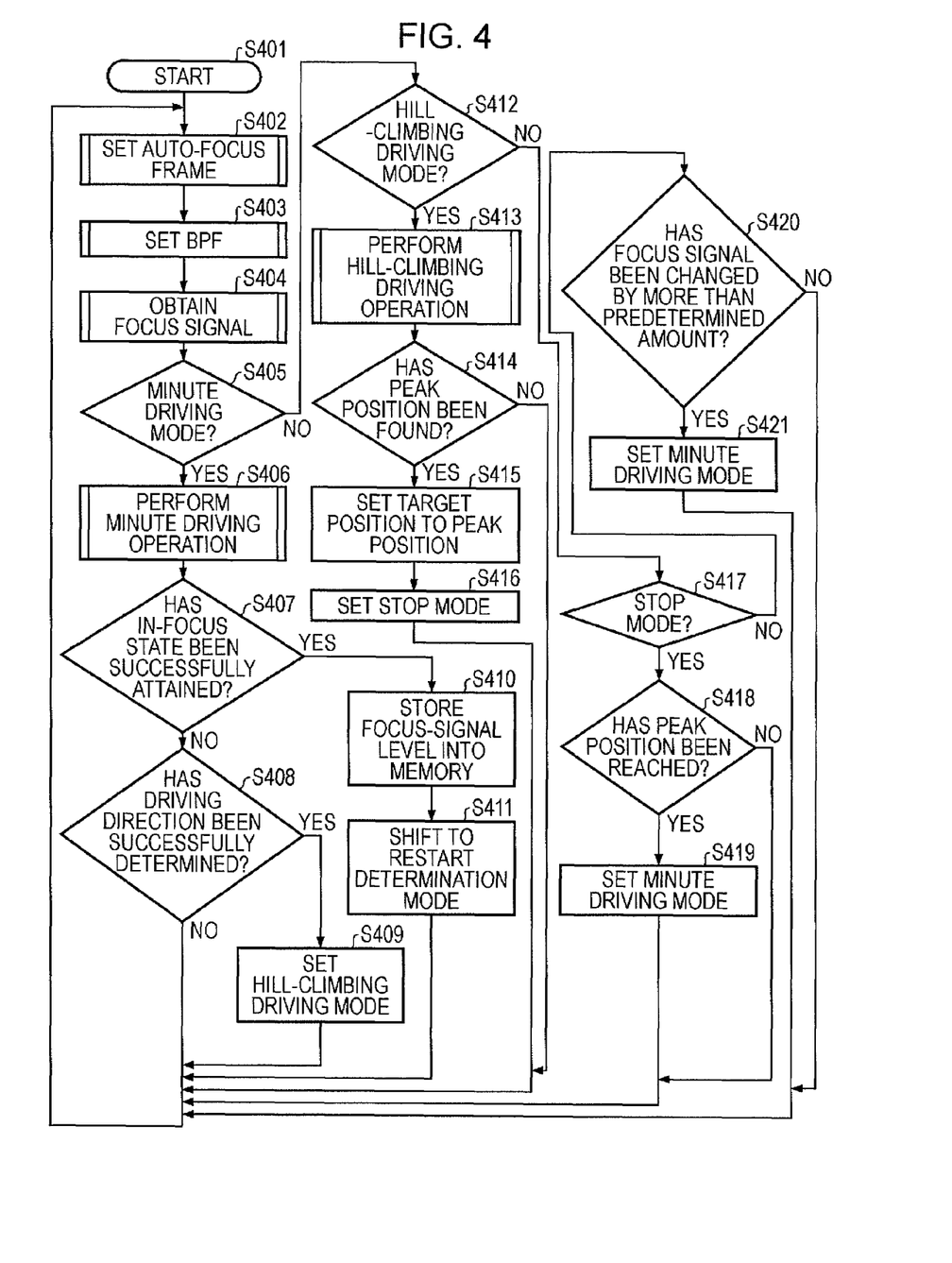
FIG. 4 is a flowchart of a TV-AF control.

Next, the TV-AF control in step S311 illustrated in FIG. 3 will be described with reference to FIG. 4. Referring to FIG. 4, in step S401, processing starts. In step S402, the position and the size of a region for obtaining focus signals from the inside of the focus-signal processing circuit 112 with respect to an image signal are set. In step S403, filter coefficients in the focus-signal processing circuit 112 are set, and a plurality of band-pass filters having different extraction characteristics are formed. The extraction characteristics are frequency characteristics of band-pass filters. Setting used herein indicates changing of a set value in a band-pass filter in the focus-signal processing circuit 112. In step S404, a focus signal is obtained from the focus-signal processing circuit 112. The focus signals obtained here are added together in a predetermined ratio and used in the subsequent focusing control.

In step S405, it is determined whether the minute driving mode is to be used. If so, flow proceeds to step S406 and the subsequent steps, where the minute driving operation is performed; otherwise flow proceeds to step S412. In step S406, the minute driving operation is performed such that the focusing lens 105 is driven by an amplitude corresponding to the set mode, and it is determined whether a focus state has been obtained, or which direction a focus point is present. The detailed operation in step S406 will be described below with reference to FIGS. 5A and 5B.

In step S407, it is determined whether the focus state has been successfully attained. If so, flow proceeds to step S410; otherwise flow proceeds to step S408. In step S408, in accordance with the set mode (responsivity priority mode A or B or mode C), it is determined whether, during the minute driving operation in step S406, the driving direction has been successfully determined. If so, flow proceeds to step S409, where the hill-climbing driving mode is set. If it does not, flow returns to step S402, and the minute driving mode continues. In step S410, a state of a focus signal in focusing is stored into a memory, and then flow proceeds to step S411, where the present mode shifts to a restart determination mode.

In step S412, it is determined whether the hill-climbing driving mode is to be used. If so, flow proceeds to step S413 and the subsequent steps, where the hill-climbing driving operation is performed. If it does not, flow proceeds to step S417. In step S413, the focusing lens 105 is driven at a predetermined speed that corresponds to the set mode in a direction at which a focus signal increases. The detailed operation will be described below with reference to FIG. 6.

In step S414, it is determined whether a peak position for a focus signal as a focus position has been found during the hill-climbing driving in step S413. If so, flow proceeds to step S415; otherwise flow returns to step S404, and the hill-climbing driving operation continues. In step S415, a position of the focusing lens 105 at which the focus signal has peaked is set as a target position, and flow then proceeds to step S416, where a stop mode is set.

In step S417, it is determined whether the stop mode is to be used. If so, flow proceeds to step S418 and the subsequent step, where the stop processing is performed. If not, flow proceeds to step S420. In step S418, it is determined whether the focusing lens 105 has returned to a position where the focus signal has peaked. If it is determined that the focusing lens 105 has returned to that position, flow proceeds to step S419, where the minute driving mode is set. If it could not been determined so, flow returns to step S402, and the stop mode continues. In step S420, the current focus signal is compared with a focus signal stored in step S410, and it is determined whether a variation in the level is large. If it is determined that the focus signal has greatly varied, flow proceeds to step S421, where the minute driving mode is set. If not, the focusing lens 105 stops, and flow returns to step S402.

Figures 5, 5A:
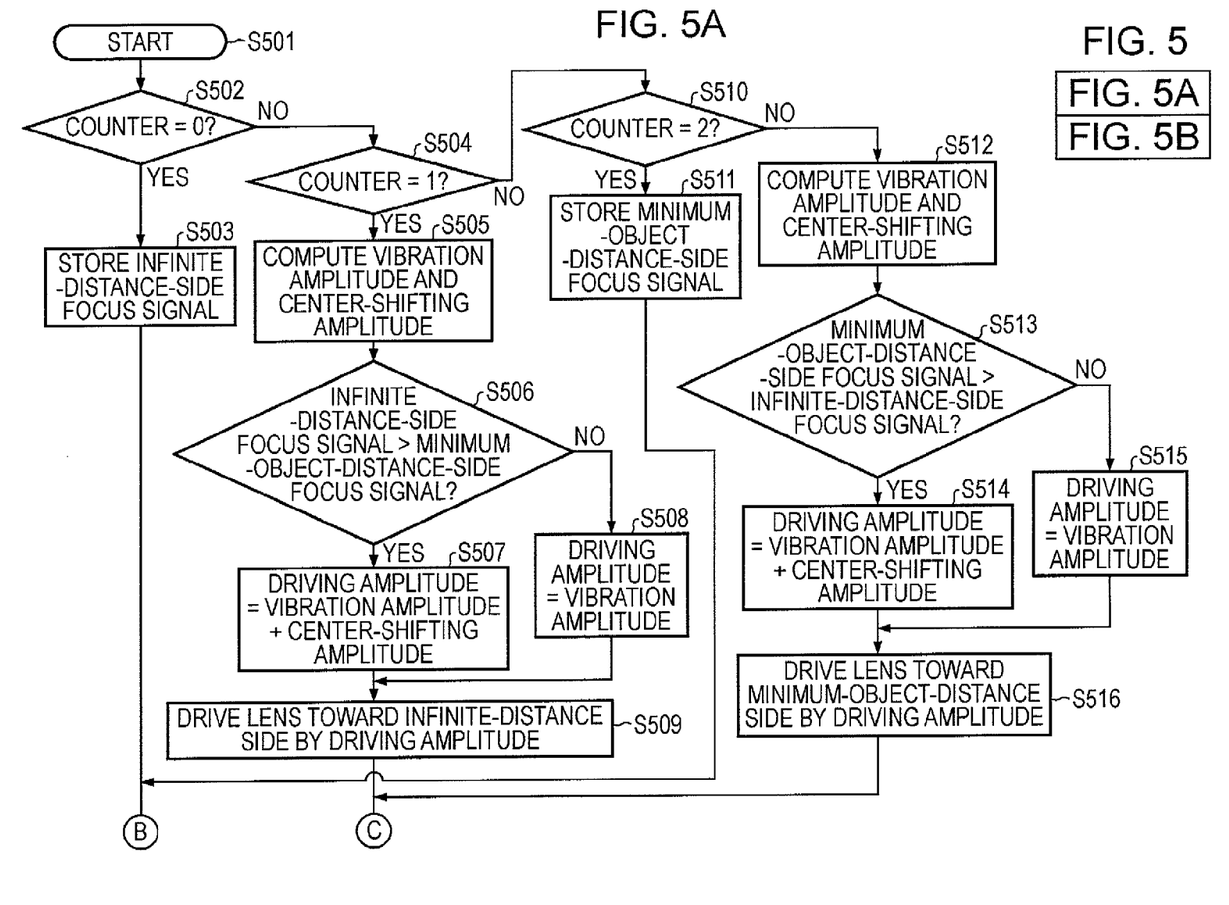
FIGS. 5A and 5B are flowcharts of an operation in a minute driving mode.
Figure 5B:
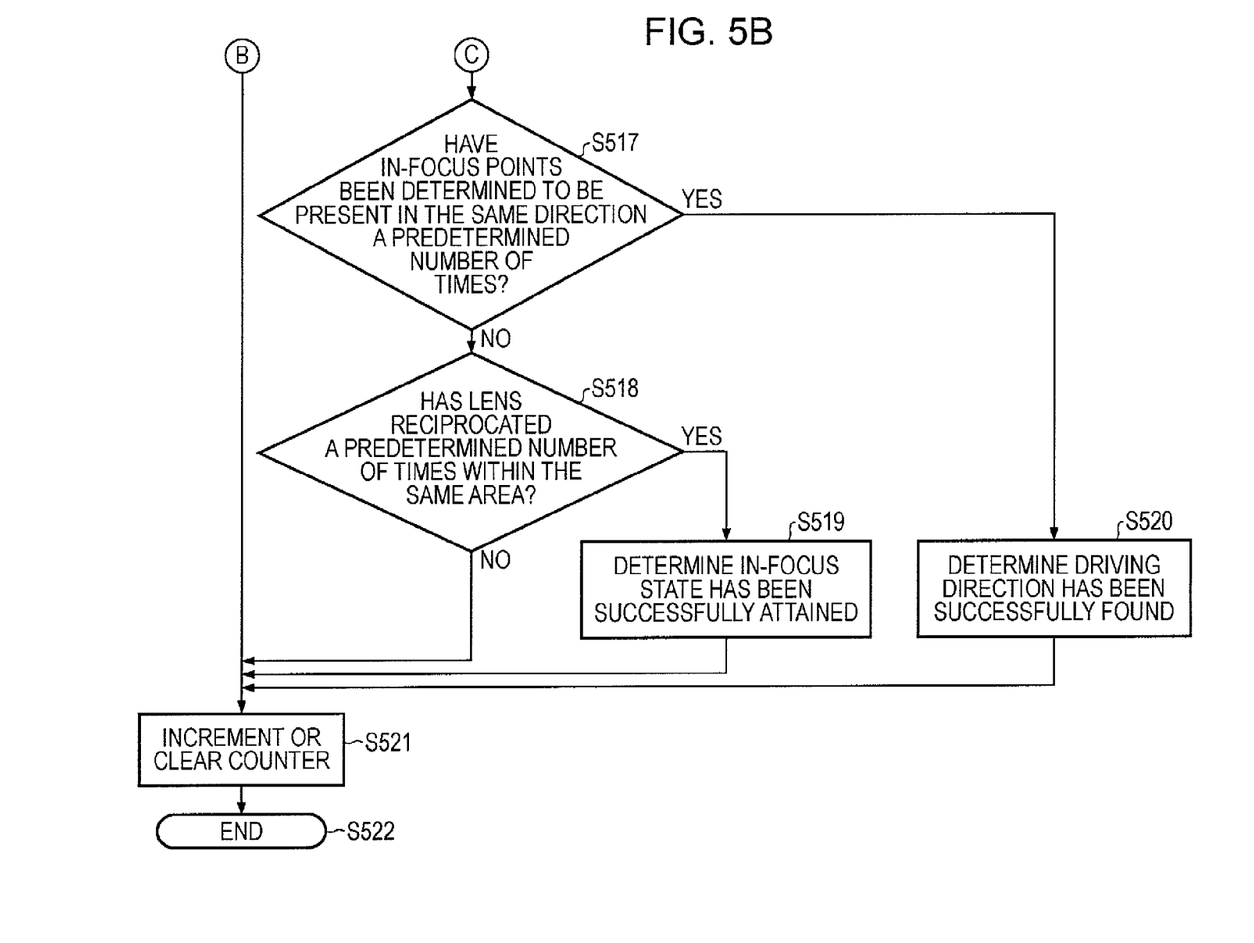

The minute driving operation will now be described with reference to FIGS. 5A and 5B. Referring to FIG. 5A, in step S501, processing starts.

In step S502, the present counter value is checked. If it is zero, flow proceeds to step S503, which is processing for when the focusing lens 105 is positioned at the infinite-distance side; otherwise flow proceeds to step S504.

In step S503, as processing for when the focusing lens 105 is positioned at the infinite-distance side, a focus signal is stored. The focus signal here depends on an image signal generated from the image pick-up element 116 (e.g., CCD or CMOS) when the focusing lens 105 is positioned at the minimum-object-distance side in step S511, which will be described below.

In step S504, the present counter value is checked. If it is one, flow proceeds to step S505 and the subsequent steps, which are processing for when the focusing lens 105 is positioned at the infinite-distance side; otherwise flow proceeds to step S510.

In step S505, in accordance with the set mode (responsivity priority mode A or B or mode C), the vibration amplitude and the center-shifting amplitude are computed. For the mode C, these amplitudes are set within depth of focus.

In step S506, the level of a focus signal at the infinite-distance side stored in step S503 is compared with the level of a focus signal at the minimum-object-distance side stored in step S511, which will be described below. If the former is larger (YES in step S506), flow proceeds to step S507; if the latter is larger (NO in step S506), flow proceeds to step S508.

In step S507, the vibration amplitude and the center-shifting amplitude are added together to find a driving amplitude. In step S508, the vibration amplitude is set as the driving amplitude. In step S509, the focusing lens 105 is driven in a direction toward the infinite-distance side by use of the driving amplitude calculated in step S507 or S508.

In step S510, the present counter value is checked. If it is two, flow proceeds to step S511, which is processing for when the focusing lens 105 is positioned at the minimum-object-distance side; otherwise flow proceeds to step S512. In step S511, as processing for when the focusing lens 105 is positioned at the minimum-object-distance side, a focus signal is stored. The focus signal here depends on an image signal generated from the image pick-up element 116 (e.g., CCD or CMOS) when the focusing lens 105 is positioned at the infinite-distance side in step S503.

The computation performed in step S512 is based on the set mode (responsivity priority mode A or B or mode C). In step S512, the vibration amplitude and the center-shifting amplitude are computed in consideration of set drive parameters. For the normal mode, these amplitudes are generally set within depth of focus.

In step S513, the level of a focus signal at the minimum-object-distance side stored in step S511 is compared with the level of a focus signal at the infinite-distance side stored in step S503. If the former is larger (YES in step S513), flow proceeds to step S514; if the latter is larger (NO in step S513), flow proceeds to step S515. In step S514, the vibration amplitude and the center-shifting amplitude are added together to find the driving amplitude. In step S515, the vibration amplitude is set as the driving amplitude.

In step S516, the focusing lens 105 is driven in a direction toward the minimum-object-distance side by use of the driving amplitude calculated in step S514 or S515. Referring to FIG. 5B, in step S517, it is checked whether focus points have been determined to be present in the same direction a predetermined number of consecutive times. The number of times, which is a criterion of determination, also corresponds to the set mode (responsivity priority mode A or B or mode C). If it is determined that the focus points are present in the same direction a predetermined number of consecutive times, flow proceeds to step S520; otherwise flow proceeds to step S518. In step S518, it is determined whether the focusing lens 105 has reciprocated within the same area a predetermined number of times. The predetermined number of times, which is a criterion of determination, also corresponds to the set mode (responsivity priority mode A or B or mode C). If it is determined that the focusing lens 105 has reciprocated a predetermined number of times within the same area, flow proceeds to step S519; otherwise flow proceeds to step S521. In step S519, it is determined that the focus state has been successfully attained. In step S520, it is determined that the driving direction has been successfully found.

In step S521, if the counter value is three, the value is cleared to zero; otherwise the counter is incremented. Then, flow proceeds to step S522, where the processing ends.

Figure 7:
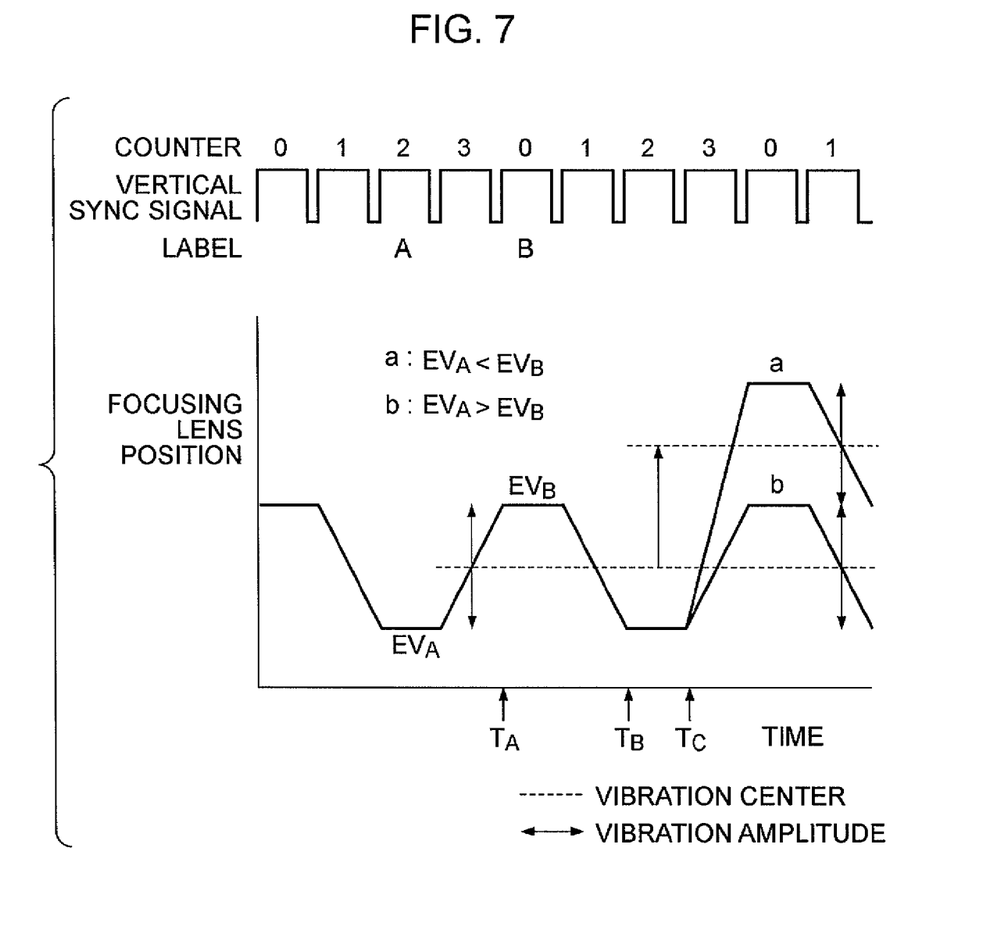
FIG. 7 illustrates how a focusing lens is driven in the minute driving mode.

A time course of the focusing lens 105 during the minute driving operation is illustrated in FIG. 7. The upper portion of the drawing illustrates a vertical synchronization signal of an image signal. In a graph illustrated in the lower portion of the drawing, the horizontal axis represents time and the vertical axis represents the position of the focusing lens 105.

A focus signal $EV_A$ obtained by the image pick-up element 106 at a time of label A is captured into the camera/AF microcomputer 113 at a time of $T_A$. A focus signal $EV_B$ obtained by the image pick-up element 106 at a time of label B is captured into the camera/AF microcomputer 113 at a time of $T_B$. At a time of $T_C$, the focus signal $EV_A$ and the focus signal $EV_B$ are compared with each other. Only when the focus signal $EV_B$ is larger, the center of vibration is moved. The movement of the focusing lens 105 here is performed relative to depth of focus, and it is set so as to have an amount that an operator cannot recognize on a screen.

Figure 6:
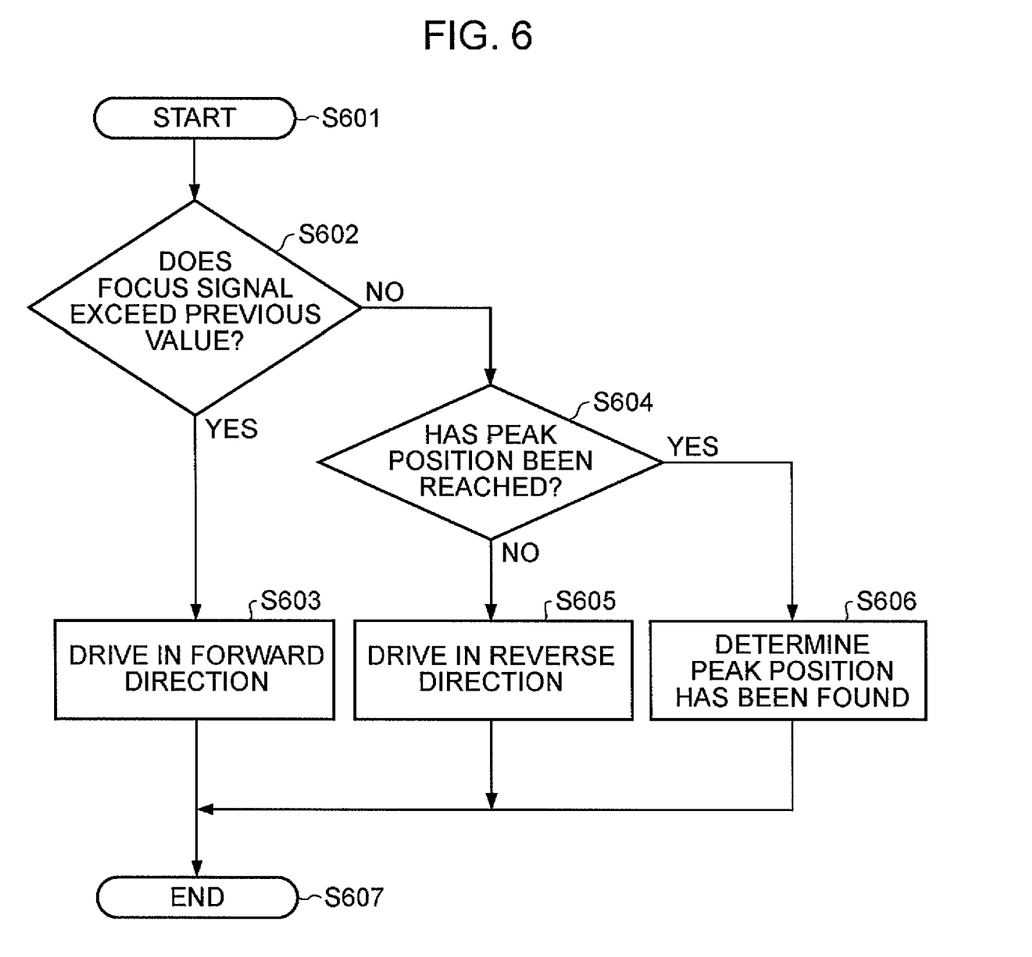
FIG. 6 is a flowchart of an operation in a hill-climbing driving mode.

The hill-climbing driving operation will now be described with reference to FIG. 6. Referring to FIG. 6, in step S601, processing starts. In step S602, it is determined whether the level of a present focus signal is larger than the previous one. If it is determined that the present level is larger, flow proceeds to step S603; otherwise flow proceeds to step S604.

The driving performed in step S603 is based on the set mode (responsivity priority mode A or B or mode C). In step S603, the focusing lens 105 is driven by the hill-climbing driving operation in the same direction as the previous one at a speed corresponding to the set mode. Then, flow proceeds to step S607.

In step S604, if the focus signal decreases after having peaked, flow proceeds to step S606. If the focus signal decreases from other factors, flow proceeds to step S605. The driving performed in step S605 is based on the set mode (responsivity priority mode A or B or mode C). In step S605, the focusing lens 105 is driven by the hill-climbing driving operation in the opposite direction to the previous one at a speed corresponding to the set mode. Then, flow proceeds to step S607.

In step S606, it is determined that the peak position has been found. In step S607, the processing ends.

Figure 8:
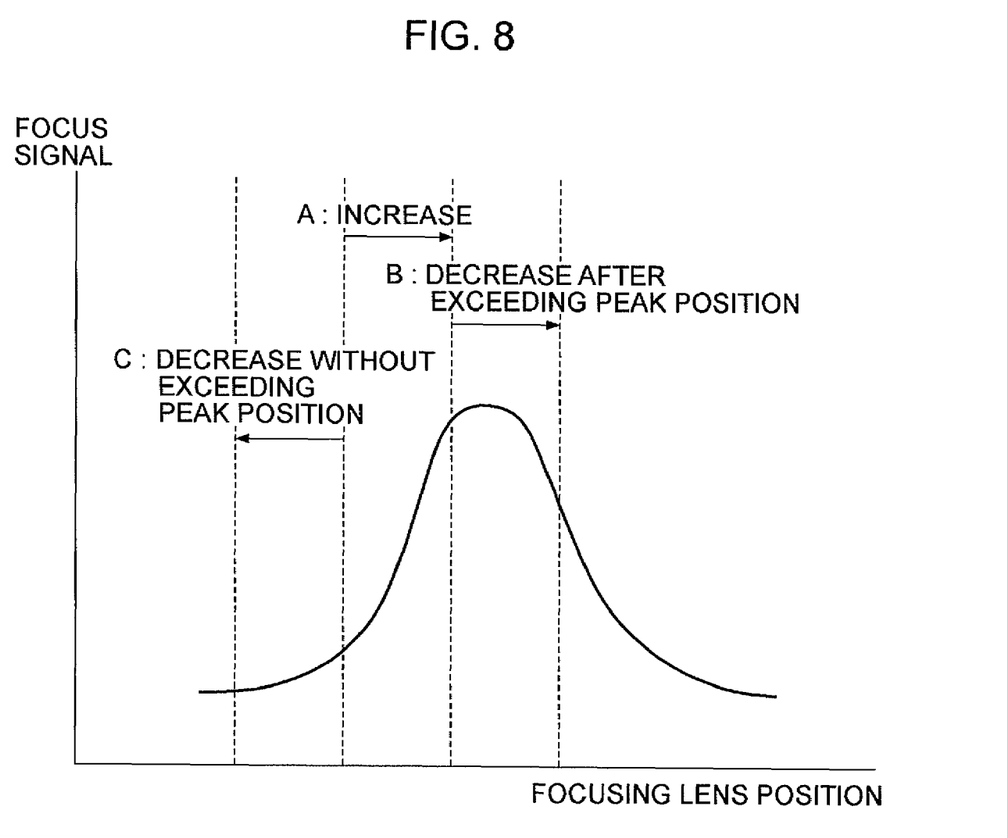
FIG. 8 illustrates how the focusing lens is driven in the hill-climbing driving mode.

FIG. 8 illustrates how the focusing lens 105 moves in the hill-climbing driving operation. Referring to FIG. 8, when the focusing lens 105 is driven as indicated by A, which means that the focus signal level increases, the hill-climbing driving operation continues in the same direction. When the focusing lens 105 is driven in a range indicated by B, the focus signal level reaches the peak and then decreases. At this time, the focus point is deemed to be present, and the hill-climbing driving operation is completed. After the focusing lens 105 returns to the peak position, the driving operation shifts to the minute driving operation. In contrast, when the focus signal level decreases without reaching the peak, as indicated by C, which means that the driving direction is deemed to be incorrect, the diving direction is inverted, and the hill-climbing driving operation continues.

In accordance with the above described embodiment, when a mode that uses a result of the phase detection process is set, driving the focusing lens by the phase detection process and that by the TV-AF process can be similar to each other while maintaining accuracy in focus detection. Consequently, focusing operation that does not lead to user discomfort can be provided.

Second Exemplary Embodiment

A second embodiment will now be described. The system configuration of an image pick-up apparatus is illustrated in the block diagram of the same FIG. 1 as in the first embodiment. Hereinafter, the description of the same components as in the first embodiment is omitted.

Figure 9:
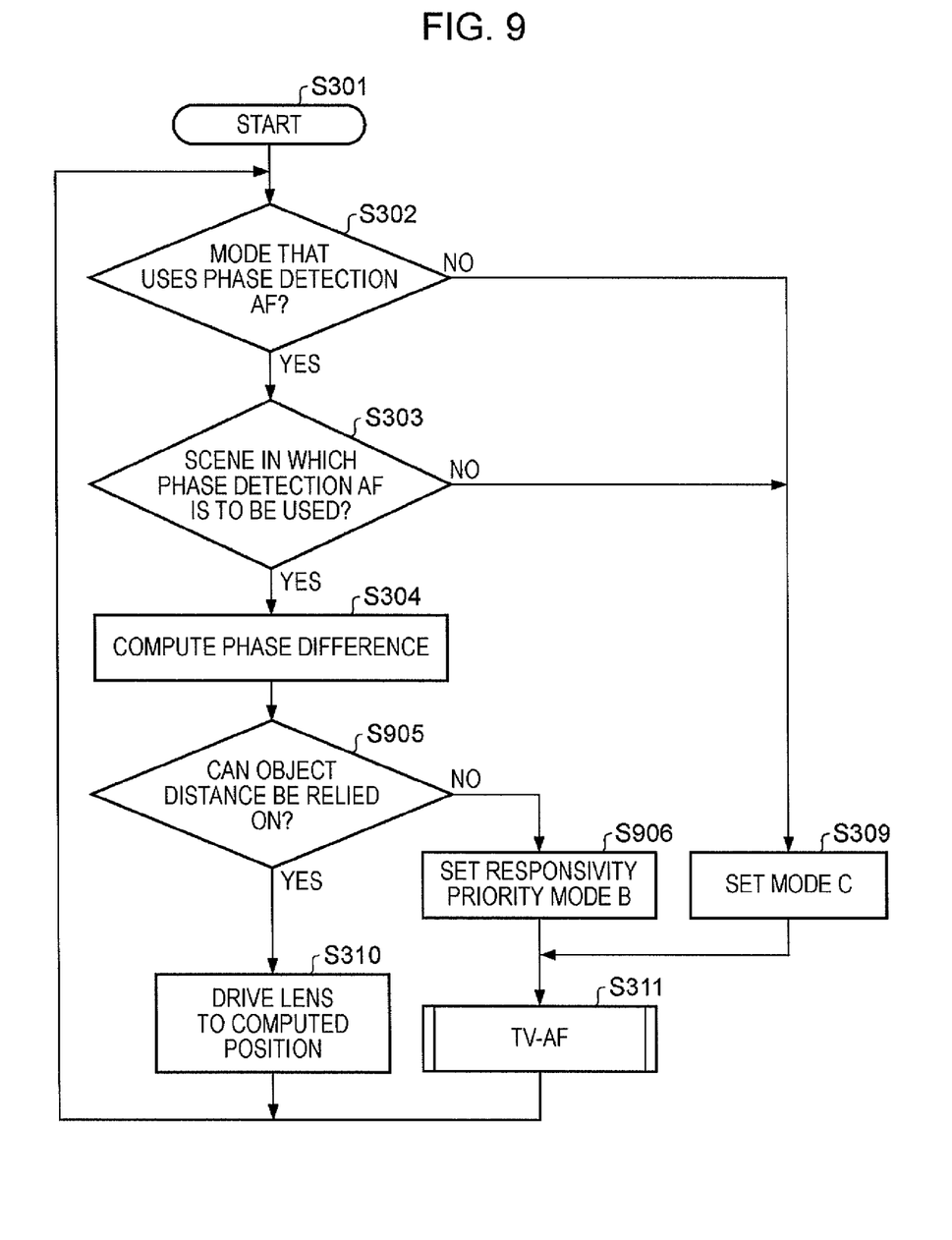
FIG. 9 is a flowchart of a hybrid focusing control according to a second embodiment.

An overview of a focusing control performed in the camera/AF microcomputer 113 will be described with reference to FIG. 9. FIG. 9 corresponds to FIG. 3, which is described in the first embodiment. Steps S301 through S304 and S309 through S311 are similar to those from FIG. 3, and therefore description of the same will not be repeated.

In step S905, it is determined whether the accuracy of the object distance computed in step S304 can be relied on and the computed object distance can be used in driving the focusing lens 105. If it is determined that the object distance can be used in driving the focusing lens 105, flow proceeds to step S310; otherwise flow proceeds to step S906. In step S906, the drive parameter for the TV-AF process is set to the above-described responsivity priority mode B. That is, according to the present embodiment, irrespective of whether the object distance has been detected or not, the condition for shifting to the hill-climbing driving operation, the speed of driving the focusing lens 105, and, additionally, the vibration amplitude for the focusing lens 105 are set. Therefore, compared with the first embodiment, even when the object distance has been detected, if both the phase detection process and the TV-AF process are performed, the focus direction and the focus state can be quickly determined. However, since the driving amplitude for the focusing lens is large even when the object distance can be detected, screen flickering may occur. In step S311, the TV-AF control is performed in accordance with the mode set in step S906 or S309.

The present embodiment is different from the first embodiment in that step S306 in FIG. 3 determines whether a result computed in step S304 has been obtained as the object distance. In the second embodiment, if, in step S905, it is determined that accuracy of the object distance computed in step S304 cannot be relied on, the drive parameter for the TV-AF process is changed.

In the second embodiment, in step S906, the responsivity priority mode B is always set. However, the responsivity priority mode B may be replaced with the responsivity priority mode A. If the responsivity priority mode A is used, the driving amplitude for the focusing lens when the object distance can be detected is similar to that for the mode C. In addition, an object beyond depth of focus can be viewed more clearly.

The system that uses the external distance-measuring unit 117 described in the first and second embodiments may be replaced with another system. For example, a TTL phase detection system may be used. This system guides object light to an AF sensor for calculating information regarding an object distance by use of a half prism. For such an image pick-up apparatus, however, it is necessary to split incident light by the half mirror in front of an aperture stop.

A second TV-AF control in step S311 illustrated in FIG. 2 will be described with reference to FIGS. 10 and 11.

Figure 10:
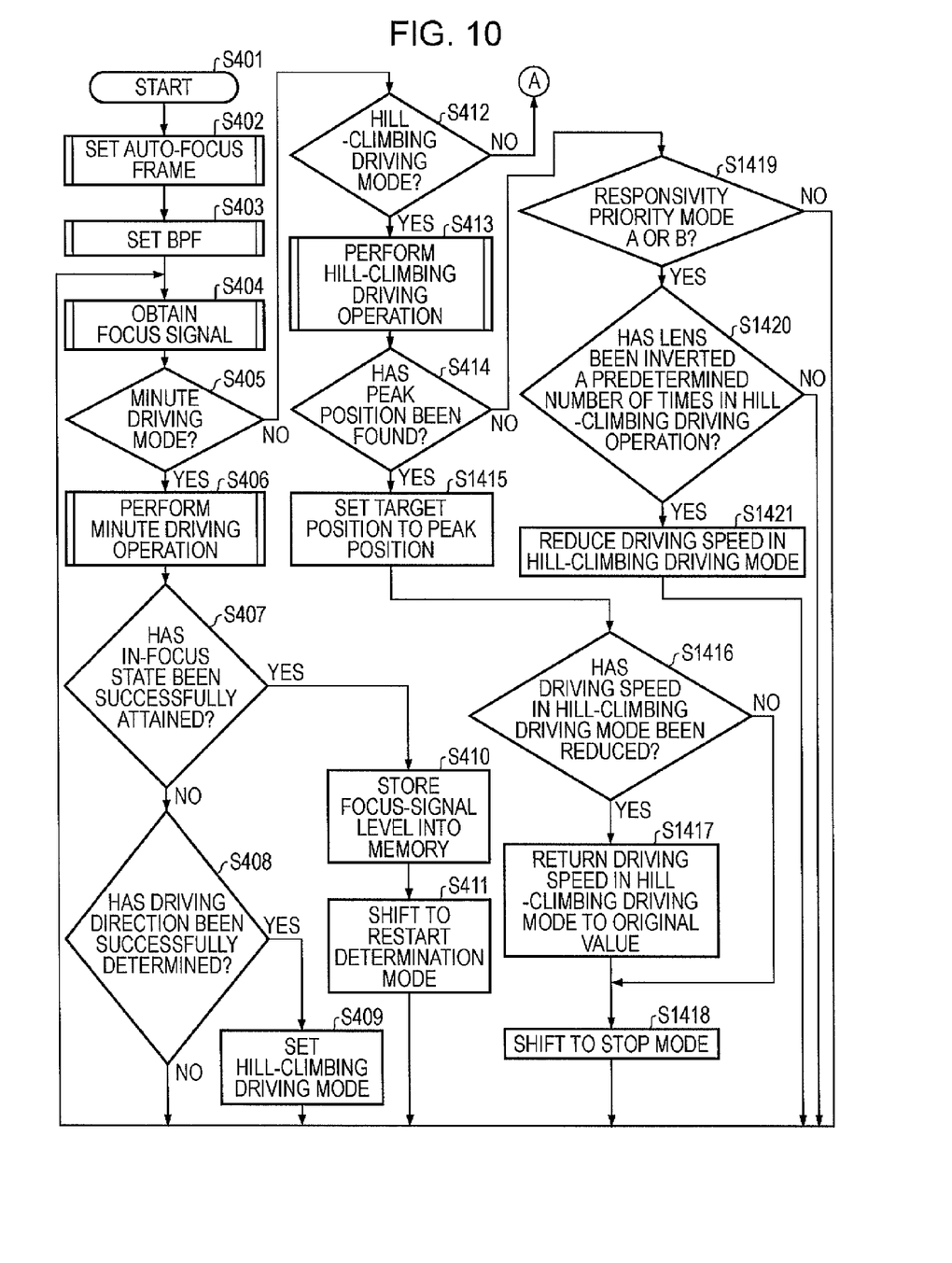
FIG. 10 is a flowchart of a second TV-AF control.

Referring to FIG. 10, steps S401 to S414 are the similar to those in FIG. 4.

In step S414, it is determined whether a peak position for a focus signal as a focus position has been found during the hill-climbing driving in step S413. If so, flow proceeds to step S1415; otherwise flow returns to step S404, and the hill-climbing driving operation continues. In step S1415, a position of the focusing lens 105 at which the focus signal has peaked is set as a target position, and flow then proceeds to step S1416.

In step S1416, it is determined whether the speed of driving the focusing lens 105 in the hill-climbing driving operation in step S1421 has been reduced. If so, flow proceeds to step S1417; otherwise flow proceeds to step S1418, where the present mode shifts to the stop mode.

In step S1417, the speed of driving the focusing lens 105 in the hill-climbing driving operation set in step S1421 returns to the original value. Then, flow proceeds to step S1418, where the present mode shifts to the stop mode.

In step S1419, it is determined whether the drive parameter for the TV-AF process has been set to one of the responsivity priority modes A and B through step S307 or S308. If so, flow proceeds to step S420; otherwise flow returns to step S402 and the hill-climbing driving operation continues.

In step S1420, it is determined whether the driving direction of the focusing lens 105 has been inverted more than a predetermined number of times in the hill-climbing driving operation in step S413. If it is determined that the driving direction has been inverted more than a predetermined number of times in the hill-climbing driving operation, flow proceeds to step S1421, where the driving speed is reduced. If it is determined that the driving direction has not been inverted more than a predetermined number of times in the hill-climbing driving operation, flow returns to step S402, and the hill-climbing driving operation continues. If the speed of moving the focusing lens is increased to reduce user discomfort when the phase detection process is used, as in the responsivity priority mode A or B, a focus signal that corresponds to a focus position in the hill-climbing driving mode may not be found, and therefore, searching for the focus position may repeat. Therefore, in the present embodiment, in the case of the responsivity priority mode A or B, if the driving direction of the focusing lens has been inverted more than a predetermined number of times in the hill-climbing driving operation, driving the focusing lens is controlled such that the speed of moving the focusing lens is reduced. Repeating inversion more than a predetermined number of times in the hill-climbing driving operation although a result of phase detection is used indicates that there is a high probability that a focus signal corresponding to a focus position has not been obtained. Therefore, a focus signal can be obtained more frequently by moving the focusing lens slowly to search for the focus position.

In step S1421, after the speed of driving the focusing lens 105 in the hill-climbing driving operation in step S413 is reduced, flow returns to step S402, and the hill-climbing driving continues.

Figure 11:
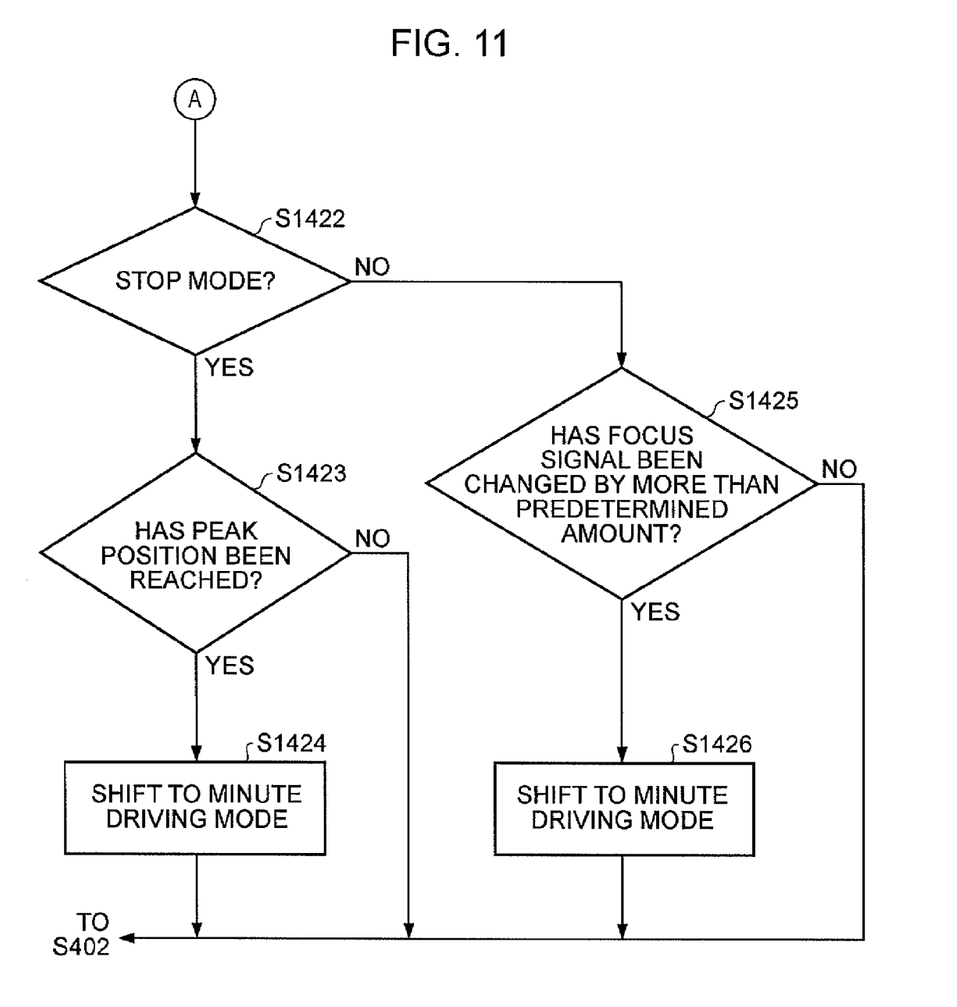
FIG. 11 is a flowchart of a process performed in the second TV-AF control.

Referring to FIG. 11, in step S1422, it is determined whether the present mode is the stop mode. If so, flow proceeds to step S1423 and the subsequent steps, where the stop processing is performed; otherwise flow proceeds to step S1425. In step S1423, it is determined whether the focusing lens 105 has returned to the peak position, at which the focus signal reaches the peak. If it is determined that the focusing lens 105 has returned to the peak position, flow proceeds to step S1424, where the minute driving mode is set. If it could not be determined that the focusing lens has returned to the peak position, flow returns to step S402, and the stop mode continues. In step S1425, the present focus signal is compared with the focus signal stored in step S410, and it is determined whether a variation in the level is large. If it is determined that the present focus signal has varied greatly, flow proceeds to step S1426, where the minute driving mode is set. If not, the focusing lens 105 stops, and flow returns to step S402.

In step S1420 in FIG. 10, if the driving direction of the focusing lens has been inverted more than a predetermined of times in the hill-climbing driving operation, the driving speed in the hill-climbing driving operation is reduced.

This may be determined on the basis of a time elapsing from the start of the hill-climbing driving operation. That is, if a predetermined period of time has elapsed since the start of the hill-climbing driving operation, flow proceeds to step S1421, where the driving speed in the hill-climbing driving operation is reduced. If a predetermined period of time has not elapsed since the start thereof, flow returns to step S402, and the hill-climbing driving operation continues. In this case, the time measured from the start of the hill-climbing driving operation may be measured from another event. For example, the time may be measured relative to inversion.

When a condition for changing the driving speed in the hill-climbing driving operation is a lapse of a predetermined time period, the time required for the hill-climbing driving operation can be maintained substantially constant.

In step S1420 in FIG. 10, the focus signal corresponding to an inversion in the hill-climbing driving operation in step S413 may be detected, and it may be determined whether the detected focus signal has more than a predetermined level. That is, if the level of the focus signal corresponding to an inversion in the hill-climbing driving operation exceeds a predetermined amount, flow proceeds to step S1421, where the driving speed in the hill-climbing driving operation is reduced. In contrast, if the level thereof is smaller than the predetermined amount, flow returns to step S402, and the hill-climbing driving operation continues.

The fact that the focus signal corresponding to an inversion has more than a predetermined level indicates that, when the focusing lens is driven in the hill-climbing driving operation, although the focus position is present by when the driving direction is inverted at an end, the focusing lens could not stop because the driving speed is high. In this case, the focusing lens can be stopped at the existing focus position by been driven again by the hill-climbing driving operation at a lower speed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-202137 filed Jul. 25, 2006 and No. 2006-228960 filed Aug. 25, 2006, which are hereby incorporated by reference herein in their entirety.

What is claimed is:

1. A focusing device comprising:
a first focus-position determining unit configured to determine a focus position based on a change in a radio-frequency component in an image signal obtained with movement of a focusing lens;
a second focus-position determining unit configured to determine a focus position by measuring a relative phase difference between two corresponding object images; and
a control unit configured to control the focusing lens to be driven to a hill-climbing driving operation in a first mode at a higher speed than in a second mode,
wherein the first mode is a mode which uses a determining result with the first focus-position determining unit together with the second focus-position determining unit, and
wherein the second mode is a mode which uses a determining result with the first focus-position determining unit without the second focus-position determining unit.

2. The focusing device according to claim 1, wherein the first focus-position determining unit operates in a minute driving mode and a hill-climbing driving mode, and
wherein the control unit is configured to make a condition for shifting from the minute driving mode to the hill-climbing driving mode in the first mode easier than in the second mode.

3. The focusing device according to claim 1, wherein the control unit is configured to make a speed of driving the focusing lens and a driving amplitude for the focusing lens in the first mode higher than in the second mode.

4. The focusing device according to claim 1, wherein, when, in the first mode, determination performed by the second focus-position determining unit is used, a speed of driving the focusing lens based on determination performed by the first focus-position determining unit is increased.

5. An image pick-up apparatus comprising:
the focusing device according to claim 1; and
an image pick-up unit configured to output the image signal.

* * * * *